(12) United States Patent
Hug

(10) Patent No.: US 7,164,575 B2
(45) Date of Patent: Jan. 16, 2007

(54) DATA CARD UNIT

(75) Inventor: Klaus Hug, Oberndorf (DE)

(73) Assignee: Siemens Aktiengesellschaft, Müchen (DE)

( * ) Notice: Subject to any disclaimer, the term of this patent is extended or adjusted under 35 U.S.C. 154(b) by 1359 days.

(21) Appl. No.: 09/995,846

(22) Filed: Nov. 27, 2001

(65) Prior Publication Data

US 2002/0085339 A1   Jul. 4, 2002

(30) Foreign Application Priority Data

Dec. 15, 2000   (DE) ............................ 200 21 266 U

(51) Int. Cl.
*H05K 5/00* (2006.01)
(52) U.S. Cl. .................................................... 361/679
(58) Field of Classification Search ................. 361/679
See application file for complete search history.

(56) References Cited

U.S. PATENT DOCUMENTS 4,597,330 A * 7/1986 Hill et al. ................. 101/93.01
5,942,744 A * 8/1999 Kamo et al. ................. 235/487

FOREIGN PATENT DOCUMENTS

| EP | 0429976 | 6/1991 |
| FR | 2781904 | 2/2000 |

* cited by examiner

Primary Examiner—Yean-Hsi Chang
(74) Attorney, Agent, or Firm—Martin A. Farber

(57) ABSTRACT

For a data card unit (1), in which the data cards (68) are transported by motor into the reading/writing position, a two-armed rocker (13), on one arm of which a closing element (57) is arranged, is provided for closing the insertion opening. The other arm of the rocker (13) has a sensing element (66, 67). The distance between the closing element (57) and the sensing element (66, 67) is chosen to be equal to or greater than the length of the data card (68) and the assignment of the closing element (57) and the sensing element (66, 67) to the plane of movement of the data card (68) is set up such that, during the insertion/ejection of a data card (68), the rocker (13) is pivoted by the data card (68) and either the closing element (57) or the sensing element (66, 67) enters the plane of movement of the data card (68).

16 Claims, 5 Drawing Sheets

DATA CARD UNIT

FIELD AND BACKGROUND OF THE INVENTION

The invention relates to a data card unit with means for automatically transporting data cards between an insertion/removal position and a reading/writing position, a carrier provided with a guide assigned to the data cards being provided, a motor-actuated transporting shaft reaching into the movement space of the data cards and means by which an insertion opening of the data card unit can be closed being provided.

With a data card unit of this type it is intended to avoid the possibility of the data transmission between a data acquisition device and a data card being disturbed with fraudulent intent. For example, to avoid a data card being briefly pulled out and inserted again during the data transmission or to avoid the electrical contact of a data card being interrupted by foils or electrically conductive material being inserted into the data card unit. On the other hand, the closing of the access opening of the data card unit is necessary if there is a relatively high risk of soiling in the operating environment of the data card unit or the device in which the data card unit is installed.

Requirements of this type for a data card unit exist, for example, when acquiring travel data in motor vehicles in which the drivers are assigned data cards provided with semiconductor memories, which serve for the driver-related storage of at least the working times and rest times. In this case, the data card unit may be integrated in a tachograph or arranged as an autonomous unit in the dashboard of a motor vehicle. In any event, it must be arranged within reach of the drivers, where there is a considerable risk of soiling and lack of space.

SUMMARY OF THE INVENTION

The object on which the invention is based was consequently, on the one hand, that the data card unit to be provided is suitable for mass production, can be produced at low cost and has a minimum overall height, to make it usable in a versatile way, and, on the other hand, that the means for closing the insertion opening of the data card unit function reliably and offer adequate protection against manipulations under the tough operating conditions existing in a motor vehicle.

The solution achieving the defined object is characterized in that a two-armed rocker which can be pivoted about an axis arranged transversely in relation to the directions of movement of the data cards is provided, one arm of which rocker has a closing element and the other arm of which has at least one sensing element, in that the distance between the closing element and the sensing element is greater than the length of a data card, in that surfaces sloping toward the plane of movement of the data cards are formed at least on the closing element in such a way that, when a data card is inserted/ejected, a pivoting of the rocker takes place and that, when a data card is located in the reading/writing position, the data card reaches into the pivoting area of the sensing element in such a way that the rocker is arrested in the closed position.

A preferred exemplary embodiment provides that the rocker is mounted on the transporting shaft provided with at least one friction element and that the carrier is formed essentially as a flat plate with a depression serving as a guide for the data cards, that means for securing a drive motor, for mounting the transporting shaft and at least one worm shaft serving for the drive connection between the drive motor and the transporting shaft are formed on the carrier and that spacing bolts for fastening the data card unit at the installation location are formed on the carrier, aligned in the same direction as the securing and mounting means.

Also important is a design such that the length of the closing element is greater than the width of the guide assigned to the data cards in the carrier and that a groove corresponding to the cross section and the length of the closing element is formed in the carrier.

An advantageous variant is characterized in that a set of reading/writing contacts, electrically contacting the contacts of data cards located in the reading/writing position, is fastened directly on the rocker.

An expedient design of the rocker provides that the rocker is formed as one part and profiled in a u-shaped manner, that bearing bores in line with one another are provided in the legs of the rocker and that a closing element and at least one sensing element are formed on, parallel to the bearing axis.

With regard to the requirements defined according to the object, the solution found offers in particular the advantage of an extremely small overall height, with the result that the data card unit concerned can, for example, also be accommodated in a tachograph which has a flat installation housing corresponding to the dimensions of a radio compartment. Also worth mentioning is the transporting of the inserted data card into a definite reading/writing position, independently of the care taken by a user, the constant frictional, and consequently shockproof, connection of an inserted data card to the transporting means and also the constant drive connection between the transporting shaft and the drive motor.

It is of decisive significance, however, that the rocker is arrested when a data card is located in the reading/writing position, in other words the insertion opening of the data card unit is closed indirectly by means of the data card, the closing element positively engaging into the groove provided in the carrier. This has the effect, with very little expenditure, of securely keeping the insertion opening closed and of providing a good sealing function, in particular if the groove is lined with an elastomeric material. It is also worth mentioning that, with the rocker formed and mounted with arms of unequal length, with a closing element attached to the longer arm, improved security against manipulations is obtained to the extent that, raising of the closing element when the data card is located in the reading/writing position has the effect that the data card is securely held with an increased force according to the chosen lever ratio.

The design of the data card unit with a torsionally rigid carrier, which may also be formed, for example, as an outsert plate, makes possible a minimal added tolerance, since the individual components and subassemblies are assigned directly to the carrier, with the result that the production of the components can be performed with tolerances that allow mass production. Furthermore, it should be emphasized that the autonomous data unit according to the invention is usable in a versatile way and, at the installation location, requires only flange mounting and a plug-in connection of the strip conductor. Moreover, in particular the embodiment in which the rocker is formed as one piece and serves as a carrier for the set of reading/writing contacts can be realized with a minimum number of components, and consequently allows production and assembly to be simplified.

DETAILED DESCRIPTION OF THE PREFERRED EMBODIMENT

Figure 1:
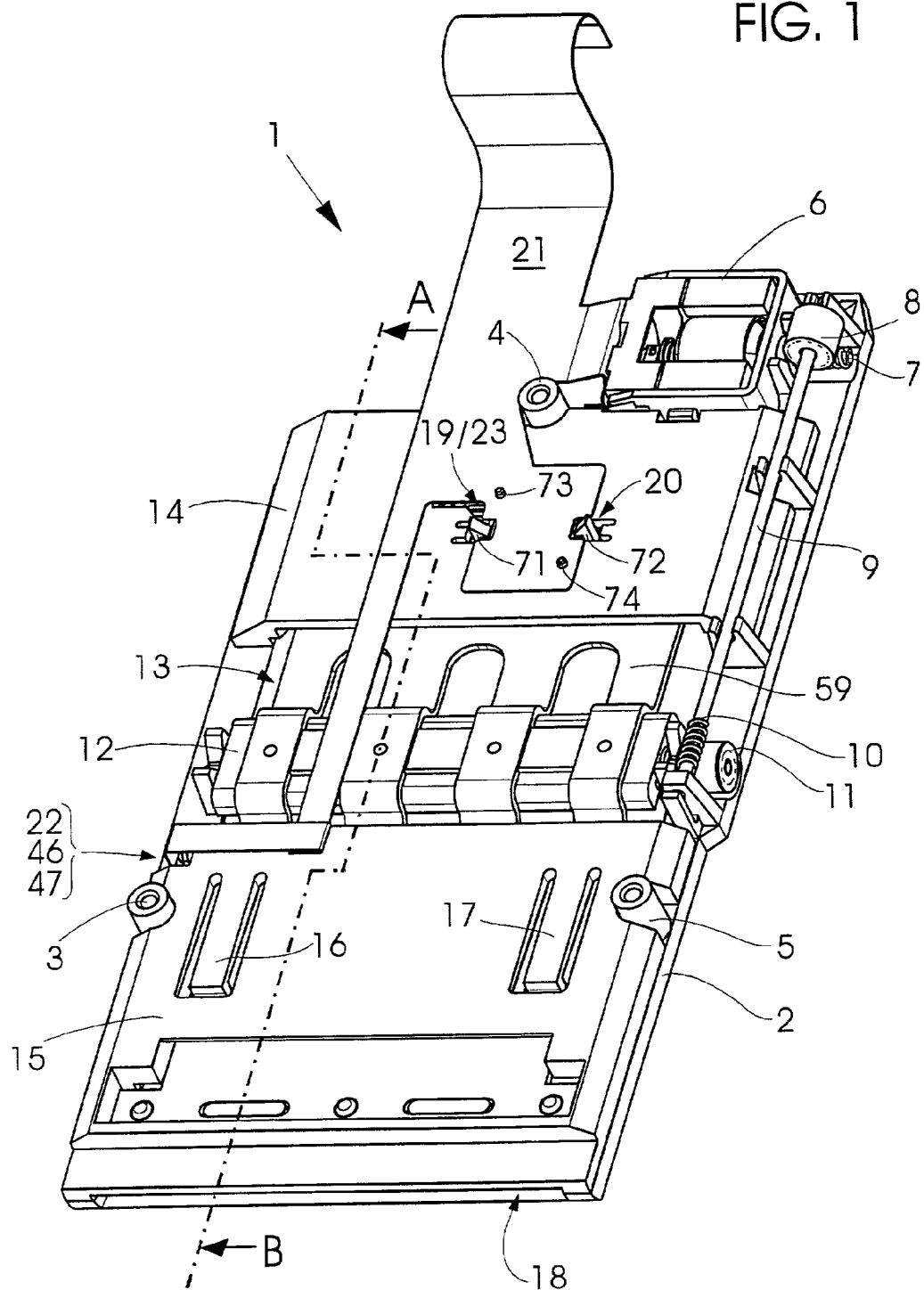
FIG. 1 shows an exemplary embodiment of the data card unit according to the invention, in a perspective representation.

FIG. 1, serving as an overview, shows that the data card unit 1 has a plate-shaped carrier 2, on which spacing bolts 3, 4 and 5 are directly formed for the flange mounting of the data card unit 1 at the installation location. In this case, the spacing bolts 3, 4, 5 may be formed with through-bores, not designated any more precisely, with blind bores assigned to self-tapping screws or with internal threads. Designated by 6 is a drive motor secured on the carrier 2, preferably a DC motor, which is in engagement, via a worm 7 arranged on its shaft, with a helical gear 8, for example. The latter is fastened on a connecting shaft 9, which is likewise mounted on the carrier 2 and meshes via a worm 10 with a gear wheel 11, which is connected, as explained later in more detail, fixedly in terms of torsion to a transporting shaft carrying one or more friction elements or is formed directly on the transporting shaft. FIG. 1 also shows a rocker 13, pivotably mounted by means of a bearing part 12 on the transporting shaft, and also a bridge 14 and a covering 15, which cover the rocker 13 and are connected to the carrier 2, it also being possible for the bridge 14 and the covering 15 to be produced as a single component. The covering 15 has resilient holding-down devices 16 and 17, assigned to the rocker 13, and together with the carrier 2 forms an alignment gap 18. Fastened to the bridge 14 is a set of reading/writing contacts 19, assigned to the contacts of the data cards, the bridge 14 being suitably provided with a relief. Designated by 21 is a flexible strip conductor, which is connected to the drive motor 6, the set of reading/writing contacts 19, a light barrier 22, signaling the insertion/removal position of a data card, and a switch 23, reporting the reading/writing position of a data card. Pawls 71 and 72 serve for the fastening of the set of reading/writing contacts 19 in that they act on the frame which secures the set of reading/writing contacts 19 and also serves for securing the switch 23. For the sake of completeness, it should also be mentioned in this connection that pins 73 and 74 formed onto the frame of the set of reading/writing contacts 19 serve for the alignment of the frame and strip conductor 21 before soldering.

Figure 2:
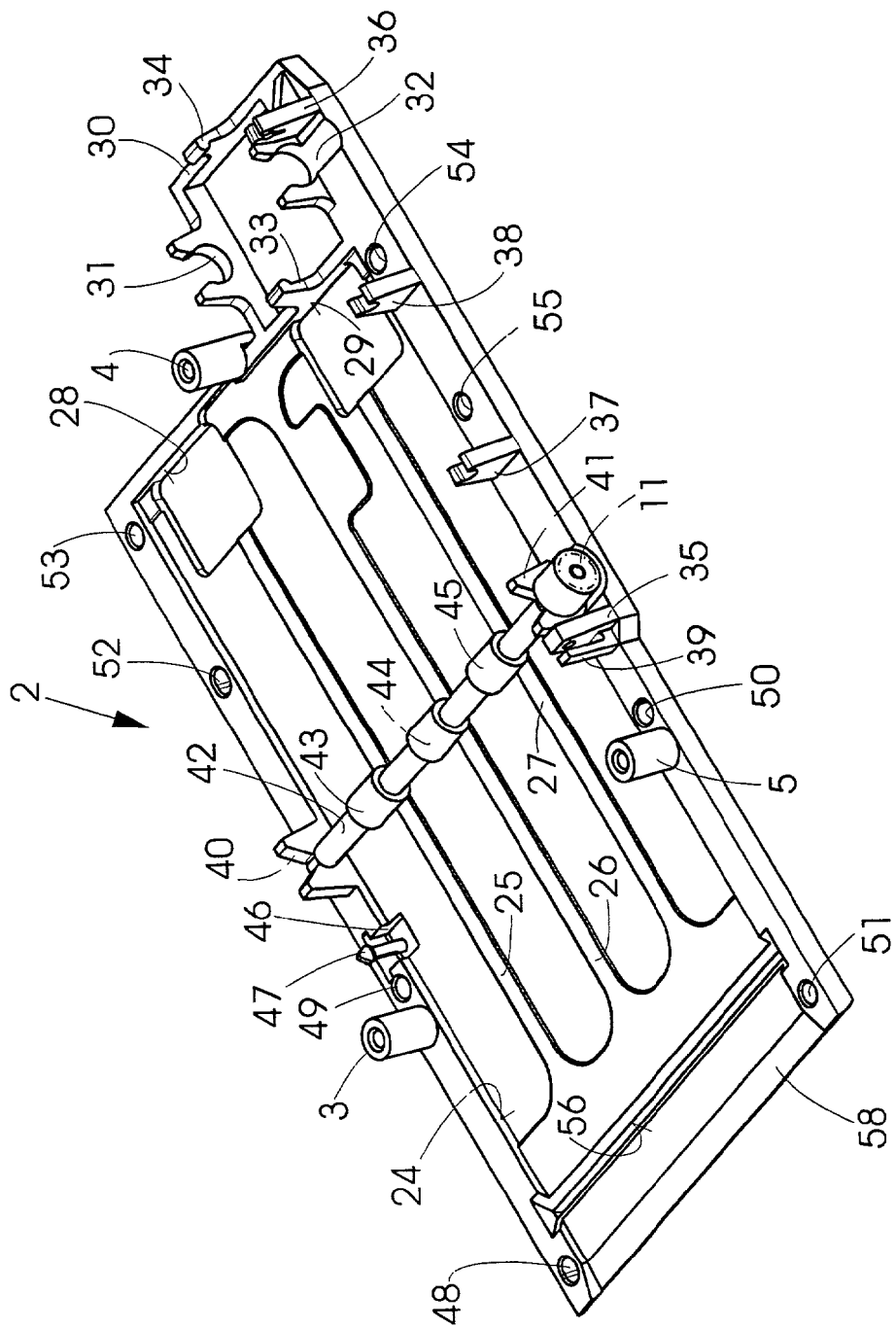
FIG. 2 shows a likewise perspectively represented mounting plate, referred to as a carrier, of the data card unit according to FIG. 1, with a pre-mounted transporting shaft.

As FIG. 2 reveals, the carrier 2, which may also be produced as an outsert plate, has a depression 24, which is open on one side, serves as a two-dimensional guide for the data cards and within which guiding ribs 25, 26 and 27 running in the direction of movement of the data cards are formed on by means of clearances which are not designated. Designated by 28 and 29 are reliefs, which may also be formed as openings. A frame which is designated by 30 and is formed on the carrier 2 serves for the securement of the drive motor 6, to be precise a securement which preferably allows an arrangement of the drive motor 6 flush with the outer surface of the carrier 2. Bearing shells 31 and 32 with assigned snap hooks, not designated any more precisely, and also resilient rings 33 and 34 serve as securing elements. Designated by 35 and 36 and also 37 and 38 are bearing arms and supporting posts, which are formed on the carrier 2 and are assigned to the connecting shaft 9. A spring leg 39 serves for axially supporting the connecting shaft 9. Two further bearing legs 40 and 41, formed on the carrier 2, are provided for the mounting of the already mentioned transporting shaft 42 and are formed in such a way that the transporting shaft 42 can be mounted by snap-in engagement. The latter carries the gear wheel 11 and also friction elements 43, 44 and 45, which consist of elastomeric material and are provided on the transporting shaft 42, which can be produced by an injection-molding technique in a number of parts or as a single component, in such a way that they are assigned to the guiding ribs 25, 26, 27 when the transporting shaft 42 is mounted in the carrier 2. A mount, designated by 46 and provided with a connecting pin 47, serves for receiving and securing the light barrier 22 signaling the insertion/removal position. Bores 48, 49 and 50, 51 serve for receiving pins formed on the covering 15; further bores 52, 53, 54 and 55 are provided for the attachment of the bridge 14 by means of suitable pins. The fastening of the two components takes place, for example, by hot upsetting of the pins formed on the covering 15 and on the bridge 14 on the outer side of the carrier 2.

FIG. 2 also shows a v-shaped groove 56 which has been made in the carrier 2 and is assigned to a closing element 57, which is fastened to the rocker 13 and likewise has a v-shaped cross section. The groove 56 is preferably formed such that it is open toward the outer side of the carrier 2, in order that dust and dirt particles brought in by means of the data cards can escape from the data card unit 1. Furthermore, to achieve an enhanced sealing function, the flanks of the groove 56 are covered with an elastomeric material. However, it is of significance that, on both sides, the groove 56 reaches beyond the lateral guidance of the data cards predetermined by the depression 24, with the result that, when the closing element 57 fastened to the rocker 13 and corresponding to the groove 56 engages in the groove 56 the access to a ready-to-use data card unit 1 is effectively sealed off. A ramp 58, formed on the carrier 2 on the insertion side, serves for guidance in the direction of the alignment gap 18 of a data card to be inserted.

Figure 3:
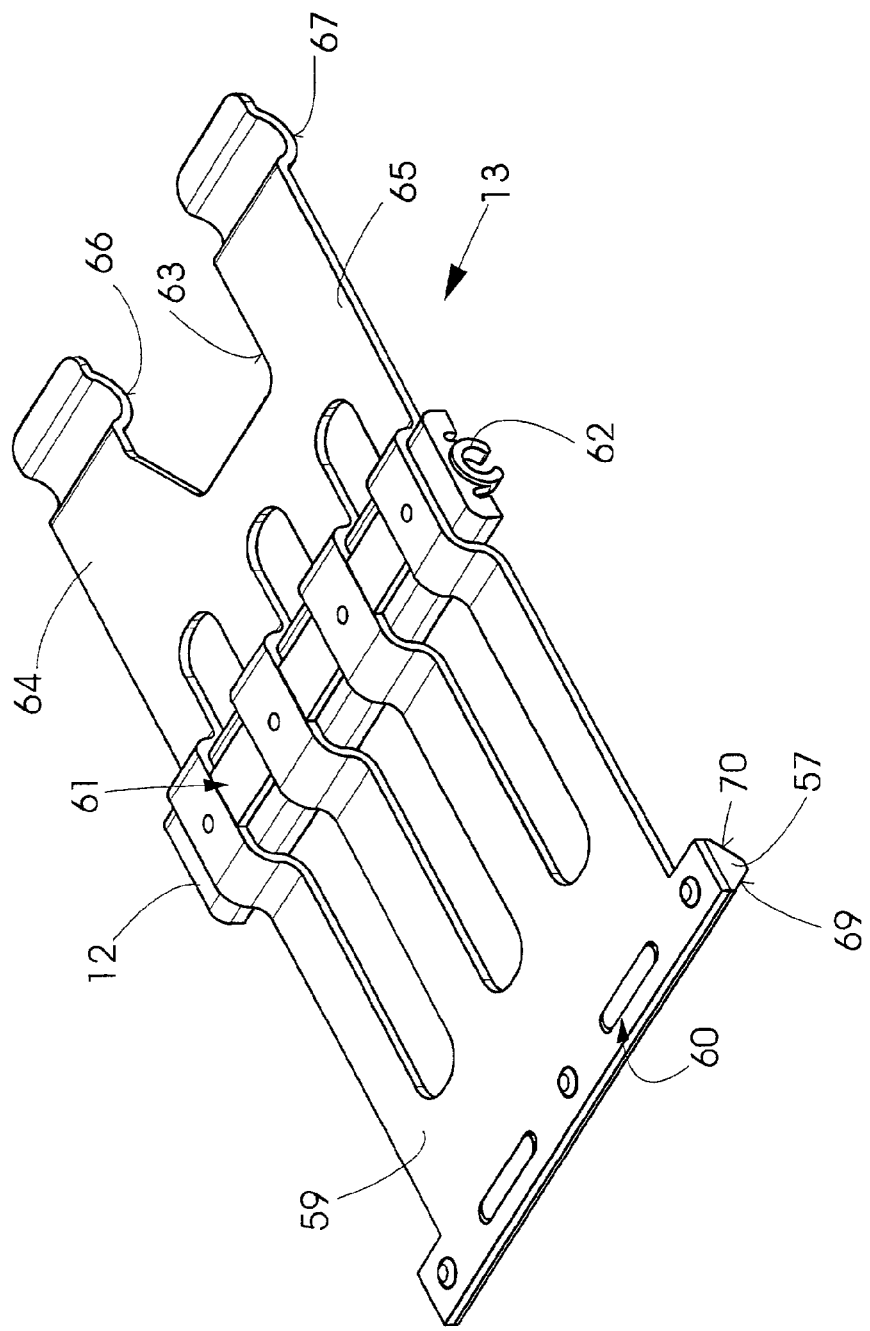
FIG. 3 shows a rocker, formed according to FIG. 1 as a combined component, in a perspective representation.

According to FIG. 3, the rocker 13 of the previously described exemplary embodiment comprises a flexurally rigid, two-armed lever 59, the bearing part 12 and the closing element 57, with the latter being fastened on the lever 59 in a suitable way. Furthermore, slot-web and slot-block joints, one of each of which is respectively designated by 60 and 61, are also provided, in order to achieve an exact parallel alignment of the closing element 57 and the bearing part 12. Designated by 62 is one of two bearing shells, by means of which the rocker 13 is mounted on the transporting shaft 42. A clearance 63 serves for allowing the set of reading/writing contacts 19 and the switch 23, combined together with the latter in one subassembly, to reach through into the movement space of the data cards. Provided on the fingers 64 and 65 of the rocker 13 which enclose the clearance 63 are beads which are aligned with each other and represent two sensing elements 66 and 67.

Figure 4:
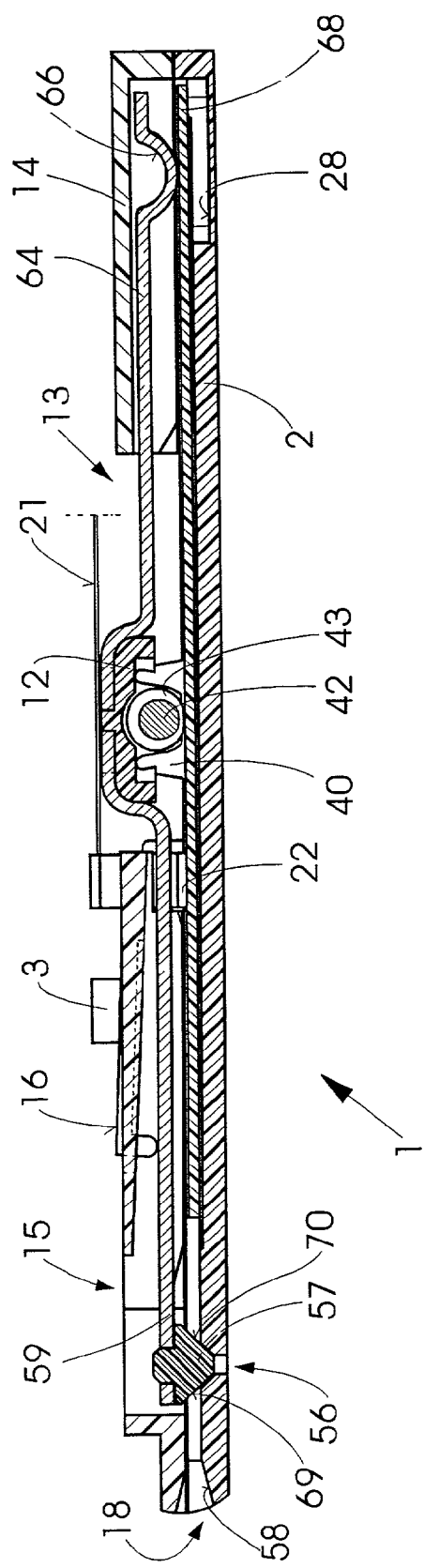
FIG. 4 shows a section of the data card unit along the sectional line A-B in FIG. 1, a data card being located in the reading/writing position within the data card unit.

The section according to FIG. 4 shows the data unit 1 in a state in which a data card 68 is located in the reading/writing position. The data card 68 reaches this position by being inserted into the alignment gap 18 of the data card unit 1 and pushed forward by hand up to the transporting shaft 42 or up to the carrying-along friction elements 43, 44, 45 of the transporting shaft 42. In this case, during the pushing-forward, the light barrier 22 arranged directly in front of the transporting shaft 42 is actuated. The signal of the light barrier 22 starts the drive motor 6, which drives the transporting shaft 42 in the direction of the drawing-in of the data card 68 until it is switched off by a signal of the switch 23.

With respect to the function of the rocker 13, which may also be mounted independently of the transporting shaft 42, it should also be mentioned that, during the pushing-forward of the data card 68, the latter, in interaction with the actuating surface 69 of the closing element 57, pivots the rocker 13 against the action of the holding-down devices 16, 17. After that, the rocker 13 remains pivoted until the closing element 57 can slide off the data card 68 and engage again in the groove 56 on account of the automatic transporting of the data card 68 taking place after the pushing-forward operation. If the data card 68 is located in the end position represented in FIG. 4, that is to say in the reading/writing position, raising of the rocker 13 from the outside is prevented by the sensing elements 66, 67 being situated opposite the data card 68 at a small distance.

When the data card 68 is ejected, the drive motor 6 is started by actuation of a button and the data card 68 is displaced until it disengages from the friction elements 43, 44, 45 of the transporting shaft 42. The data card 68 is then located in the removal position; the drive motor 6 is switched off during the removal of the data card 68 by a signal of the light barrier 22 or in a time-dependent manner. During the transporting of the data card 68, the rocker 13 is pivoted again, in that the one front edge, not designated any more precisely, of the data card 68 interacts with the actuating surface 70 of the closing element 57, which presupposes that the data card 68 must have left the pivoting area of the sensing elements 66, 67 during the raising of the rocker 13. That is to say, the distance between the closing element 57 and the sensing elements 66, 67 must be at least equal to, but for reliable functioning greater than, the length of the data card 68. After the removal of the data card 68, the rocker 13 is pivoted back by the holding-down devices 16, 17 into the starting position, in which the closing element 57 in conjunction with the groove 56 performs a sealing function.

The assembly of the data unit 1 proceeds from putting the carrier 2 in place, snapping in the transporting shaft 42 and fitting the drive motor 6, with a pre-assembled subassembly comprising the drive motor 6, the strip conductor 21, the set of reading/writing contacts 19, including the switch 23, and the light barrier 22 advantageously being fastened on the carrier 2 when the drive motor 6 is fitted, in that the drive motor 6 and the light barrier 22 are locked on the carrier 2. This is followed by mounting the connecting shaft 9 and snapping the rocker 13 onto the transporting shaft 42, with the pre-assembled strip-conductor subassembly, that is to say the portion of the strip-conductor subassembly carrying the set of reading/writing contacts 19, initially being swung away to the side. After fitting on the bridge 14 and the covering 15 and connecting the two components to the carrier 2, to make it ready to use the data card unit 1 is completed by locking the set of reading/writing contacts 19 in place.

Figure 5:
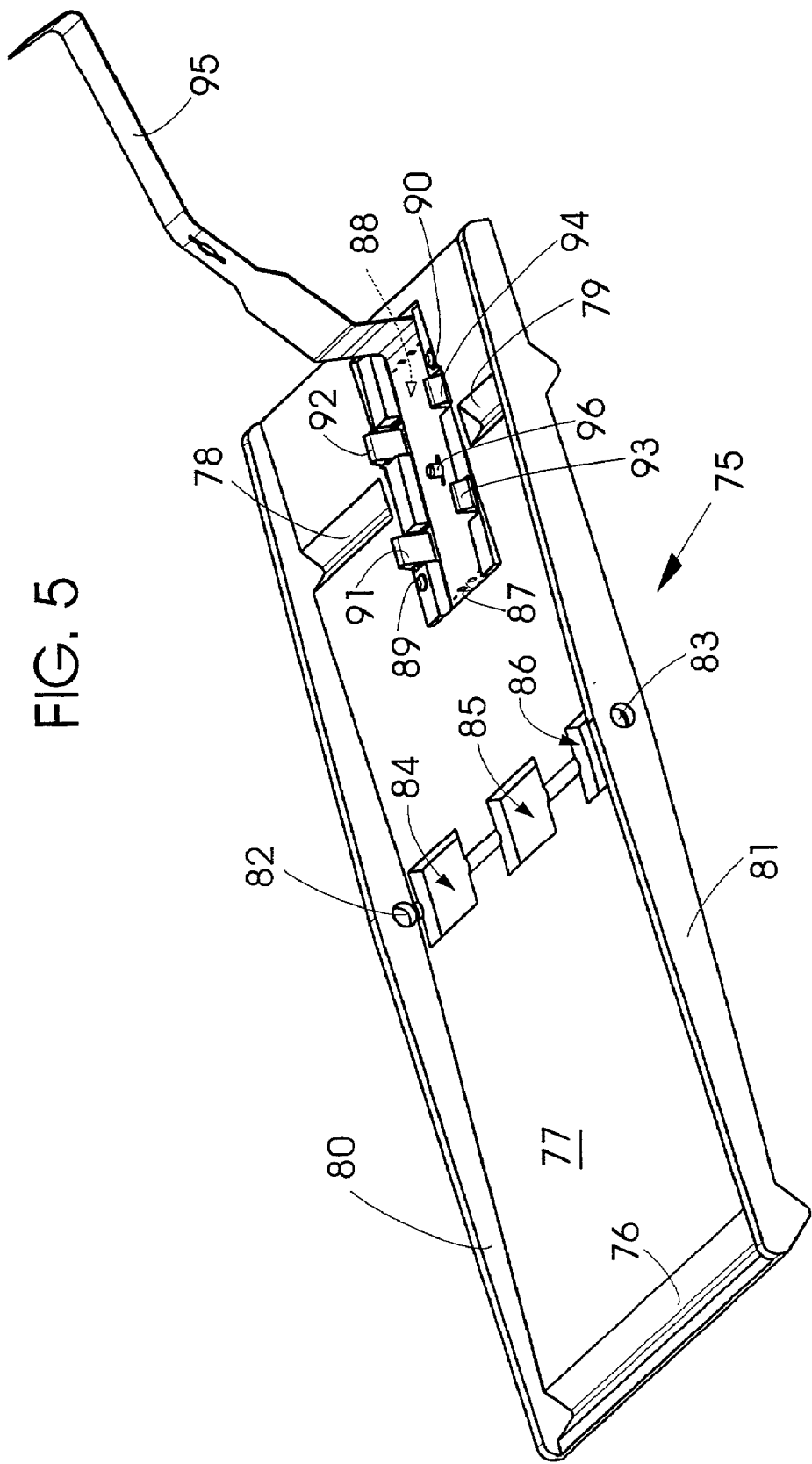
FIG. 5 shows a further perspectively represented embodiment of the rocker with a set of reading/writing contacts fastened on it.

In the case of the embodiment of a rocker 75 according to FIG. 5, a closing element 76 is formed directly on the plate-shaped body 77 of the rocker 75. Similarly, sensing elements 78 and 79 are formed on. Legs designated by 80 and 81 serve for the formation of a u-profile and consequently the stiffening of the rocker 75. Provided in these legs are bearing bores 82 and 83, assigned to the transporting shaft 42. Openings 84, 85 and 86 serve for allowing the friction elements 43, 44 and 45 arranged on the transporting shaft 42 to reach through into the movement space of the data cards 68. Designated by 87 is a mount which is formed in the rocker 75 and into which a set of reading/writing contacts 88 can be inserted from the side of the rocker 75 assigned to the data cards 68. In this case, pin connections 89 and 90, formed between a frame of the set of reading/writing contacts 88 and the rocker 75, serve for the alignment of the set of reading/writing contacts 88 and latching pawls 91, 92, 93 and 94, formed on the frame, serve for the locking of the set of reading/writing contacts 88 on the rocker 75. A flexible strip conductor connected to the set of reading/writing contacts 88 is designated by 95; a centering pin 96 serves for the alignment of the strip conductor 95 before its soldering to the writing/reading contacts. With this one-part and dimensionally stable embodiment of the rocker 75, the requirement for components for the data card unit 1 can be reduced to a minimum, in particular if the alignment gap 18 assigned to the closing element 76 and at least one resilient holding-down device 16, 17 are formed directly on the carrier 2.

The invention claimed is:

1. Data card unit with means for automatically transporting data cards between an insertion/removal position and a reading/writing position, a carrier provided with a guide assigned to the data cards being provided, a motor-actuated transporting shaft reaching into the movement space of the data cards and means by which an insertion opening of the data card unit can be closed being provided, characterized in that a two-armed rocker (13) which can be pivoted about an axis arranged transversely in relation to the directions of movement of the data cards (68) is provided, one arm of which rocker has a closing element (57) and the other arm of which has at least one sensing element (66, 67), in that the distance between the closing element (57) and the sensing element (66, 67) is equal to or greater than the length of a data card (68), in that surfaces (69, 70) sloping toward the plane of movement of the data cards (68) are formed in a v-shaped manner at least on the closing element (57) in such a way that, when a data card (68) is inserted/ejected, a pivoting of the rocker (13) takes place and that, when a data card (68) is located in the reading/writing position, the data card (68) reaches into the pivoting area of the sensing element (66, 67) in such a way that the rocker (13) is arrested in the closed position.

2. Data card unit according to claim 1, characterized in that the rocker (13) is mounted on the transporting shaft (42) provided with at least one friction element (43, 44, 45).

3. Data card unit according to claim 1, characterized in that the rocker (13) is formed with arms of unequal length, the closing element (57) being provided on the longer arm of the rocker (13).

4. Data card unit according to claim 1, characterized in that at least the sensing element (66, 67) is formed directly on the rocker (13).

5. Data card unit according to claim 1, characterized in that clearances (28, 29) for the sensing element (66, 67) and the closing element (57) to pass through the movement space of the data cards (68) are formed in the carrier (2).

6. Data card unit according to claim 1, characterized in that the length of the closing element (57) is greater than the width of the guide assigned to the data cards (68) in the carrier (2) and in that a groove (56) corresponding to the cross section and the length of the closing element (57) is formed in the carrier (2).

7. Data card unit according to claim 6, characterized in that the groove (56) is lined with an elastomeric material.

8. Data card unit according to claim 1, characterized in that a bridge (14) which can be connected to the carrier (2) and reaches over the rocker (13) is provided and in that a set of reading/writing contacts (19) electrically contacting the contacts of data cards (68) located in the reading/writing position is fastened on the bridge (14).

9. Data card unit according to claim 1, characterized in that a set of reading/writing contacts (19), electrically contacting the contacts of data cards (68) located in the reading/writing position, is fastened directly on the rocker (13).

10. Data card unit according to claim 1, characterized in that a covering (15) which can be connected to the carrier (2) and reaches over the rocker (13) is provided and, together with the carrier (2), forms an alignment gap (18) assigned to the closing element (56).

11. Data card unit according to claim 1, characterized in that an alignment gap (18) assigned to the closing element (57) is formed directly on the carrier (2).

12. Data card unit according to claim 10, characterized in that at least one resilient holding-down device (16, 17), assigned to the rocker (13), is formed on the covering (15).

13. Data card unit according to claim 1, characterized in that at least one resilient holding-down device (16, 17), assigned to the rocker (13), is formed directly on the carrier (2).

14. Data card unit according to claim 1, characterized in that the carrier (2) is formed essentially as a flat plate with a depression (24) serving as a guide for the data cards (68), in that means (30, 31, 32, 33, 34) for securing a drive motor (6), for mounting (40, 41) the transporting shaft (42) and for mounting (35, 36, 37, 38, 39) and at least one connecting shaft (9) serving for the drive connection between the drive motor (6) and the transporting shaft (42) are formed on the carrier (2) and in that spacing bolts (3, 4, 5) for fastening the data card unit (1) at the installation location are formed on the carrier (2), aligned in the same direction as the securing and mounting means.

15. Data card unit according to claim 1, characterized in that switches (22, 23) reporting the insertion/removal position and the reading/writing position of a data card (68) are provided and in that the switches (22, 23), the set of reading/writing contacts (19) and the drive motor (6) are connected by means of a flexible strip conductor (21) led out from the data card unit (1).

16. Data card unit according to claim 1, characterized in that the rocker (13) is formed as one part and profiled in a u-shaped manner, in that bearing bores (82, 83) in line with one another are provided in the legs (80, 81) of the rocker (13) and in that a closing element (76) and at least one sensing element (78, 79) are formed on directly, parallel to the bearing axis.

* * * * *